(12) United States Patent
Noikas et al.

(10) Patent No.: US 10,642,180 B2
(45) Date of Patent: May 5, 2020

(54) ELECTROSTATIC INK COMPOSITIONS

(71) Applicant: HP Indigo B.V., Amstelveen (NL)

(72) Inventors: Biana Noikas, Rehovot (IL); Guy Nesher, Nes Ziona (IL); Dror Kella, Nes Ziona (IL); Yaron Grinwald, Meitar (IL); Regina Guslitzer, Nes Ziona (IL); Emad Masoud, Nes Ziona (IL)

(73) Assignee: HP Indigo B.V., Amstelveen (NL)

(*) Notice: Subject to any disclaimer, the term of this patent is extended or adjusted under 35 U.S.C. 154(b) by 0 days.

(21) Appl. No.: 15/569,347

(22) PCT Filed: Jul. 17, 2015

(86) PCT No.: PCT/EP2015/066464
§ 371 (c)(1),
(2) Date: Oct. 25, 2017

(87) PCT Pub. No.: WO2017/012640
PCT Pub. Date: Jan. 26, 2017

(65) Prior Publication Data

US 2018/0081292 A1   Mar. 22, 2018

(51) Int. Cl.
*G03G 9/12* (2006.01)
*C09D 11/50* (2014.01)
*C09D 11/52* (2014.01)
*C09D 11/10* (2014.01)
*G03G 9/13* (2006.01)

(52) U.S. Cl.
CPC .............. *G03G 9/122* (2013.01); *C09D 11/10* (2013.01); *C09D 11/50* (2013.01); *C09D 11/52* (2013.01); *G03G 9/131* (2013.01)

(58) Field of Classification Search
CPC .......... G03G 9/12; G03G 9/122; G03G 9/131; G03G 9/132; G03G 9/133
See application file for complete search history.

(56) References Cited

U.S. PATENT DOCUMENTS

| | | |
|---|---|---|
| 3,405,683 A | 10/1968 | Ions et al. |
| 3,900,003 A | 8/1975 | Sato et al. |
| 4,073,266 A | 2/1978 | Arneth et al. |
| 4,342,823 A | 8/1982 | Grant et al. |
| 4,400,079 A | 8/1983 | Landa |
| 4,504,138 A | 3/1985 | Kuehnle et al. |
| 4,690,539 A | 9/1987 | Radulski et al. |
| 5,100,580 A | 3/1992 | Powell et al. |

(Continued)

FOREIGN PATENT DOCUMENTS

| | | |
|---|---|---|
| EP | 0410800 | 7/1989 |
| EP | 2100907 | 9/2009 |

(Continued)

OTHER PUBLICATIONS

"DuPontTM Nucrel® 599" DuPont Packaging & Industrial Polymers Data Sheet, 3 pages.

(Continued)

*Primary Examiner* — Peter L Vajda
(74) *Attorney, Agent, or Firm* — Dierker & Kavanaugh PC

(57) ABSTRACT

Herein is disclosed an electrostatic ink composition. In some examples, the electrostatic ink compositions comprise: a carrier liquid; a resin; and a phosphorescent pigment.

18 Claims, 1 Drawing Sheet

(56) References Cited

U.S. PATENT DOCUMENTS

| | | |
|---|---|---|
| 5,176,980 A | 1/1993 | Santilli et al. |
| 5,749,032 A | 5/1998 | Landa et al. |
| 6,319,591 B1 | 11/2001 | Malhotra |
| 6,376,147 B1 | 4/2002 | Bonsignore et al. |
| 6,402,986 B1 | 6/2002 | Jones et al. |
| 6,623,902 B1 | 9/2003 | Ben-Avraham et al. |
| 6,905,538 B2 | 6/2005 | Auslander |
| 8,287,757 B2 | 10/2012 | Agrawal et al. |
| 8,394,562 B2 | 3/2013 | Veregin et al. |
| 8,652,354 B2 | 2/2014 | Chen et al. |
| 2002/0019312 A1 | 2/2002 | Ramsden |
| 2008/0233313 A1 | 9/2008 | Chatow et al. |
| 2010/0062360 A1* | 3/2010 | Victor ............... G03G 9/125 430/111.41 |
| 2012/0028054 A1* | 2/2012 | Agrawal ............. B05D 5/06 428/447 |
| 2013/0280648 A1 | 10/2013 | Gilson et al. |
| 2014/0008441 A1 | 1/2014 | Huynh |
| 2014/0320576 A1* | 10/2014 | Bar-Haim ........... G03G 9/131 347/112 |

FOREIGN PATENT DOCUMENTS

| | | | |
|---|---|---|---|
| JP | 56-167149 | * 12/1981 | ............ G03G 9/08 |
| WO | WO 2007/130069 | 11/2007 | |
| WO | WO 2012/130303 | 10/2012 | |
| WO | WO 2013/107498 | 7/2013 | |

OTHER PUBLICATIONS

"Phosphorescent Technologies", Glow Data Sheet, 2015, 3 pages http://glow.glowinc.com/phosphorescent-technologies/.

International Search Report and Written Opinion for International Application No. PCT/EP2015/066464 dated Sep. 16, 2015, 11 pages.

"Phosphorescent Pigments", Kolorjet Chemicals PVT. Ltd. Data Sheet, 3 pages, http://www.dyes-pigments.com/phosphorescent.html.

"Light Fast—Super Bright Long Afterglow Phosphorescent Pigments", LumiNova® Data Sheet, pp. 1-8.

"Pigments > Conventional Zinc and Sulfide Based Pigments", UMC United Mineral & Chemical Corp Datasheet, 2 pages, http://www.umccorp.com/zincpigs.htm.

"Phosphorescence", Definition of phosphorescence by The Free Dictionary, page, http://www.thefreedictionary.com/phosphorescence.

* cited by examiner

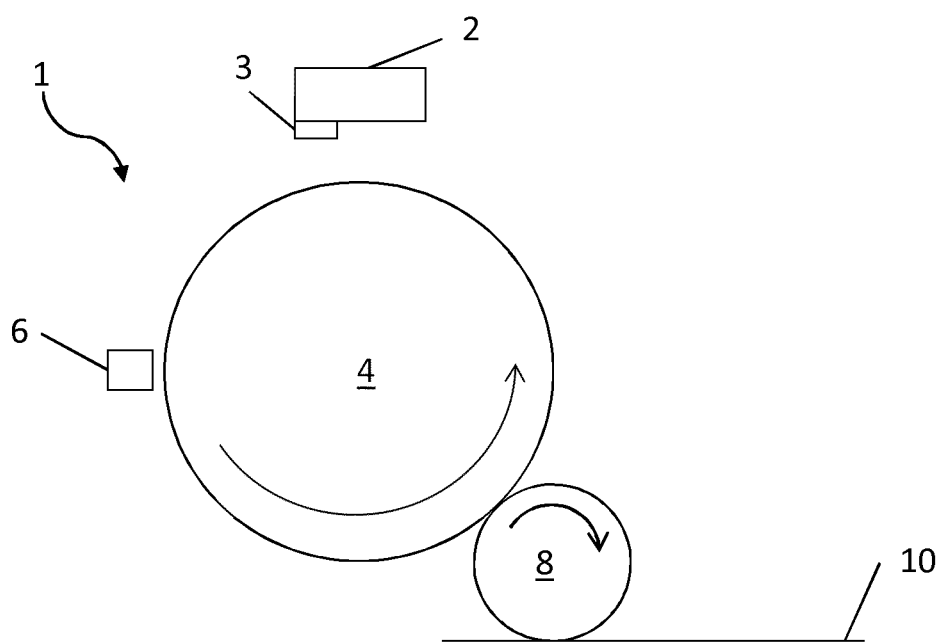

ELECTROSTATIC INK COMPOSITIONS

BACKGROUND

Electrophotographic printing processes, sometimes termed electrostatic printing processes, typically involve creating an image on a photoconductive surface, applying an ink having charged particles to the photoconductive surface, such that they selectively bind to the image, and then transferring the charged particles in the form of the image to a print substrate.

The photoconductive surface may be on a cylinder and is often termed a photo imaging plate (PIP). The photoconductive surface is selectively charged with a latent electrostatic image having image and background areas with different potentials. For example, an electrostatic ink composition including charged toner particles in a liquid carrier can be brought into contact with the selectively charged photoconductive surface. The charged toner particles adhere to the image areas of the latent image while the background areas remain clean. The image is then transferred to a print substrate (e.g. paper) directly or, by being first transferred to an intermediate transfer member, which can be a soft swelling blanket, which is often heated to fuse the solid image and evaporate the liquid carrier, and then to the print substrate.

BRIEF DESCRIPTION OF THE FIGURES

FIG. 1 is a schematic illustration of an example of a Liquid Electro Photographic (LEP) printing apparatus for printing an electrostatic ink composition.

DETAILED DESCRIPTION

Before the methods, compositions, print substrates and related aspects of the disclosure are disclosed and described, it is to be understood that this disclosure is not limited to the particular process steps and materials disclosed herein because such process steps and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "liquid carrier," "carrier," or "carrier vehicle" refers to the fluid in which the polymer resin, pigment, charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "electrostatic ink composition" generally refers to an ink composition, which may be in liquid form, that is typically suitable for use in an electrostatic printing process, sometimes termed an electrophotographic printing process. The electrostatic ink composition may include chargeable particles of the resin and the pigment dispersed in a liquid carrier, which may be as described herein.

As used herein, "co-polymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic(ally) printing" or "electrophotographic(ally) printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrophotographic ink composition to an electric field, e.g. an electric field having a field strength of 1000 V/cm or more, in some examples 1000 V/mm or more.

As used herein, the term "about" is used to provide flexibility to a numerical range endpoint by providing that a given value may be a little above or a little below the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Unless otherwise stated, any feature described herein can be combined with any aspect or any other feature described herein.

In an aspect, there is provided an electrostatic ink composition. The electrostatic ink composition comprises, in some examples:
 a carrier liquid;
 a resin; and
 a phosphorescent pigment.

In an aspect, there is provided a method of producing an electrostatic ink composition. The method comprises, in some examples, combining a resin, a phosphorescent pigment and a carrier liquid.

In an aspect, there is provided a method of printing an electrostatic ink composition. The method comprises, in some examples:
- providing an electrostatic ink composition;
- contacting the electrostatic ink composition with a latent electrostatic image on a surface to create a developed image; and
- transferring the developed image to a print substrate, wherein the electrostatic ink composition comprises a carrier liquid, a resin; and a phosphorescent pigment.

Phosphorescent Pigment

The electrostatic ink composition comprises a phosphorescent pigment. The term "phosphorescent pigment" as used herein refers to a pigment which glows in the dark for an extended period of time after the pigment has been exposed to natural or artificial light and the light source removed. In some examples, a phosphorescent pigment is a pigment for which the average lifetime of excited atoms or molecules is greater than $10^{-8}$ seconds. In some examples, an extended period of time is at least $10^{-4}$ seconds, in some examples at least 10-3 seconds, in some examples at least 0.01 seconds, in some examples at least 0.1 second, in some examples at least 1 second, in some examples at least 5 seconds, in some examples at least 10 seconds, in some examples at least 30 seconds, in some examples at least one minute, in some examples at least 2 minutes, in some examples at least 5 minutes, in some examples at least 15 mins, in some examples at least 30 mins, in some examples at least 1 hour, in some examples at least 2 hours. A phosphorescent pigment absorbs energy from natural light or artificial light and re-emits this energy after an extended period of time in the form of light, for example, light having a wavelength of between 380 nm and 750 nm.

In some examples, the phosphorescent pigment is an inorganic pigment.

In some examples, the phosphorescent pigment is selected from an aluminate, a zinc sulfide, or a silicate.

In some examples the phosphorescent pigment comprises or consists of an aluminate, for example, an alkaline earth metal aluminate, a titanium aluminate or a silicate aluminate. In some examples the phosphorescent pigment is selected from a strontium aluminate (for example, a strontium oxide aluminate), a magnesium aluminate, a calcium aluminate or a barium aluminate. In some examples, the phosphorescent pigment comprises strontium aluminate. In some examples, the phosphorescent pigment comprises strontium oxide aluminate.

In some examples, the phosphorescent pigment comprises silicon and/or titanium.

In some examples, the phosphorescent pigment comprises silicon and/or titanium in addition to an alkaline earth metal aluminate.

In some examples, the phosphorescent pigment comprises an aluminate, for example an alkaline earth metal aluminate, doped with Europium.

In some examples, the phosphorescent pigment comprises an aluminate, for example, Ultra green V10 (PDPG) from Glow Inc; LumiNOVA GLL-300FF PHOSPHORESCENT PIGMENT, LumiNOVA BGL-300FF PHOSPHORESCENT PIGMENT LumiNOVA V-300M from UMC United Mineral & Chemical.

In some examples, the phosphorescent pigment comprises zinc sulfide, for example, 6SSU, GSS 205/1, GSS 207/1, GSS 305/1, GSS 507/1, GSS 905/1, GSS 86/1, GSR and GSR 115/2 from UMC United Mineral & Chemical. In some examples, the phosphorescent pigment comprises crystals of zinc sulfide. In some examples, the phosphorescent pigment comprises crystals of zinc sulfide which are activated with copper and/or manganese. In some examples, the phosphorescent pigment comprises crystals of zinc sulfide containing copper.

In some examples the phosphorescent pigment is selected from Ultra green V10 (PDPG) from Glow Inc; LumiNOVA GLL-300FF PHOSPHORESCENT PIGMENT, LumiNOVA BGL-300FF PHOSPHORESCENT PIGMENT, LumiNOVA V-300M, 6SSU, GSS 205/1, GSS 207/1, GSS 305/1, GSS 507/1, GSS 905/1, GSS 8B/1, GSR and GSR 115/2 from UMC United Mineral & Chemical.

In some examples, the phosphorescent pigment constitutes greater than 5 wt. % by total solids of the electrostatic ink composition, in some examples greater than 10 wt. % by total solids of the electrostatic ink composition.

In some examples, the phosphorescent pigment constitutes up to about 60 wt. % by total solids of the electrostatic ink composition, in some examples up to about 50 wt. % by total solids of the electrostatic ink composition.

In some examples, the phosphorescent pigment constitutes from about 10 wt. % to about 50 wt. % by total solids of the electrostatic ink composition.

Liquid Carrier

The electrostatic ink composition includes a liquid carrier. In some examples, pigment particles including the resin and the phosphorescent pigment may be dispersed in the liquid carrier. The liquid carrier can include or be a hydrocarbon, silicone oil, vegetable oil, etc. The liquid carrier can include, but is not limited to, an insulating, non-polar, non-aqueous liquid that can be used as a medium for ink particles, i.e. the ink particles including the resin and, in some examples, a pigment. The liquid carrier can include compounds that have a resistivity in excess of about $10^9$ ohm-cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™ Nisseki Naphthesol H™, #0 Solvent L™, #0 Solvent M™, #0 Solvent H™, Nisseki Isosol 300™ Nisseki Isosol 400™ AF-4™, AF-S™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™)

The liquid carrier can constitute about 20% to 99.5% by weight of the electrostatic ink composition, in some examples 50% to 99.5% by weight of the electrostatic ink composition. The liquid carrier may constitute about 40 to 90% by weight of the electrostatic ink composition. The liquid carrier may constitute about 60% to 80% by weight of the electrostatic ink composition. The liquid carrier may constitute about 90% to 99.5% by weight of the electrostatic ink composition, in some examples 95% to 99% by weight of the electrostatic ink composition.

The electrostatic ink composition, when printed on a print substrate, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the print substrate contains less than 5 wt % liquid carrier, in some examples, less than 2 wt % liquid carrier, in some examples less than 1 wt % liquid carrier, in some examples less than 0.5 wt % liquid carrier. In some examples, the ink printed on the print substrate is free from liquid carrier.

Resin

The electrostatic ink composition includes a resin, which may be a thermoplastic resin. A thermoplastic polymer is sometimes referred to as a thermoplastic resin. The resin may coat the phosphorescent pigment. In some examples, the resin coats the phosphorescent pigment such that particles are formed having a core of phosphorescent pigment and an outer layer of resin thereon. The outer layer of resin may coat the phosphoresent pigment partially or completely.

The resin typically includes a polymer. In some examples, the polymer of the resin may be selected from ethylene acrylic acid copolymers; ethylene methacrylic acid copolymers; ethylene vinyl acetate copolymers; copolymers of ethylene (e.g. 80 wt % to 99.9 wt %), and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is, in some examples, from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

In some examples, the polymer is a copolymer of an alkylene monomer and a monomer having an acid side group. In some examples the alkylene monomer is an ethylene or a propylene monomer. In some examples, the monomer having an acid side group is an acrylic acid monomer or a methacrylic acid monomer.

The resin may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer, in some examples a polymer having acidic side groups, that has a melt flow rate of less than about 60 g/10 minutes, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes.

In some examples, the polymer having acid side groups has a melt flow rate of greater than about 120 g/10 minutes, in some examples greater than about 200 g/10 minutes, in some examples greater than about 300 g/10 minutes, in some examples greater than about 400 g/10 minutes. In some examples, the polymer having acid side groups has a melt flow rate of about 450 g/10 minutes. In some examples, the resin is Nucrel 599™ (sold by E. I. du PONT).

In some examples, the polymer having acid side groups has a melt flow rate of less than about 500 g/10 minutes.

In some examples, the polymer having acid side groups has a melt flow rate in the range of about 150 g/10 minutes to about 600 g/10 minutes. In some examples, the polymer having acid side groups has a melt flow rate in the range of about 200 g/10 minutes to about 500 g/10 minutes.

In some examples, the polymer having acid side groups constitutes at least 50 wt. % of the resin, in some examples at least 60 wt. % in some examples at least 80 wt. %, in some examples at least 90 wt. %. In some examples, the polymer having acid side groups has a melt flow rate of greater than about 200 g/10 minutes, in some examples a melt flow rate of greater than about 200 g/10 minutes and up to about 500 g/10 minutes, and constitutes at least 50 wt. % of the resin, in some examples at least 60 wt. % in some examples at least 80 wt. %, in some examples at least 90 wt. %.

The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SUR- LYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the copolymer.

The resin may comprise two different polymers having acidic side groups. The two polymers having acidic side groups may have different acidities, which may fall within the ranges mentioned above. The resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The resin may comprise two different polymers having acidic side groups: a first polymer that is a copolymer of ethylene (e.g. 92 to 85 wt %, in some examples about 89 wt %) and acrylic or methacrylic acid (e.g. 8 to 15 wt %, in some examples about 11 wt %) having a melt flow rate of 80 to 110 g/10 minutes and a second polymer that is a co-polymer of ethylene (e.g. about 80 to 92 wt %, in some examples about 85 wt %) and acrylic acid (e.g. about 18 to 12 wt %, in some examples about 15 wt %), having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

In any of the resins mentioned above, the ratio of the first polymer having acidic side groups to the second polymer having acidic side groups can be from about 10:1 to about 2:1. In another example, the ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If resin comprises a single type of resin polymer, the resin polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the copolymer, in some examples from 16 wt % to about 20 wt % of the copolymer in some examples from 17 wt % to 19 wt % of the copolymer.

In some examples, the resin essentially consists of a copolymer of ethylene and methacrylic acid. In some examples the methacrylic acid of the copolymer of ethylene and methacrylic acid constitutes about 8 wt % to about 12 wt % of the copolymer, in some examples about 9 wt % to about 11 wt % of the copolymer, in some examples about 10 wt. % of the copolymer.

In an example, the resin constitutes about 5 to 90%, in some examples about 5 to 80%, by weight of the solids of the electrostatic ink composition. In another example, the resin constitutes about 10 to 60% by weight of the solids of the electrostatic ink composition. In another example, the resin constitutes about 15 to 40% by weight of the solids of the electrostatic ink composition. In another example, the resin constitutes about 60 to 95% by weight, in some examples from 80 to 90% by weight, of the solids of the electrostatic ink composition.

The resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples 5 to 40% by weight, in some examples 5 to 20% by weight of the copolymer, in some examples 5 to 15% by weight of the copolymer. The second monomer may constitute 1 to 50% by weight of the co-polymer, in some examples 5 to 40% by weight of the co-polymer, in some examples 5 to 20% by weight of the co-polymer, in some examples 5 to 15% by weight of the copolymer. In an example, the first monomer constitutes 5 to 40% by weight of the co-polymer, the second monomer constitutes 5 to 40% by weight of the co-polymer, and with the third monomer constituting the remaining weight of the copolymer. In an example, the first monomer constitutes 5 to 15% by weight of the co-polymer, the second monomer constitutes 5 to 15% by weight of the co-polymer, with the third monomer constituting the remaining weight of the copolymer. In an example, the first monomer constitutes 8 to 12% by weight of the co-polymer, the second monomer constitutes 8 to 12% by weight of the co-polymer, with the third monomer constituting the remaining weight of the copolymer. In an example, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute 1% or more by weight of the total amount of the resin polymers in the resin, e.g. the total amount of the polymer or polymers having acidic side groups and polymer having ester side groups. The polymer having ester side groups may constitute 5% or more by weight of the total amount of the resin polymers in the resin, in some examples 8% or more by weight of the total amount of the resin polymers in the resin, in some examples 10% or more by weight of the total amount of the resin polymers in the resin, in some examples 15% or more by weight of the total amount of the resin polymers in the resin, in some examples 20% or more by weight of the total amount of the resin polymers in the resin, in some examples 25% or more by weight of the total amount of the resin polymers in the resin, in some examples 30% or more by weight of the total amount of the resin polymers in the resin, in some examples 35% or more by weight of the total amount of the resin polymers in the resin. The polymer having ester side groups may constitute from 5% to 50% by weight of the total amount of the resin polymers in the resin, in some examples 10% to 40% by weight of the total amount of the resin polymers in the resin, in some examples 15% to 30% by weight of the total amount of the polymers in the resin.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples 10 g/10 minutes to about 50 g/10 minutes, in some examples about 20 g/10 minutes to about 40 g/10 minutes, in some examples about 25 g/10 minutes to about 35 g/10 minutes.

In an example, the polymer or polymers of the resin can be selected from the Nucrel family of toners (e.g. Nucrel 403™, Nucrel 407™ Nucrel 609HS™, Nucrel 908HS™, Nucrel 1202HC™, Nucrel 30707™, Nucrel 1214™, Nucrel 903™, Nucrel 3990™ Nucrel 910™, Nucrel 925™, Nucrel 699™, Nucrel 599™, Nucrel 960™, Nucrel RX 76™, Nucrel 2806™ Bynell 2002, Bynell 2014, and Bynell 2020 (sold by E. I. du PONT)), the Aclyn family of toners (e.g. Aaclyn 201, Aclyn 246, Aclyn 285, and Aclyn 295), and the Lotader family of toners (e.g. Lotader 2210, Lotader, 3430, and Lotader 8200 (sold by Arkema)).

In some examples, the pigment constitutes a certain wt %, e.g. from 1 wt %, to 60 wt % of the solids of the electrostatic ink composition, and the remaining wt % of the solids of the electrostatic ink composition is formed by the resin and, in some examples, any other additives that are present. The other additives may constitute 10 wt % or less of the solids of the electrostatic ink composition, in some examples 5 wt % or less of the solids of the electrostatic ink composition, in some examples 3 wt % or less of the solids of the electrostatic ink composition. In some examples, the resin may constitute 5% to 99% by weight of the solids in the electrostatic ink composition, in some examples 50% to 90% by weight of the solids of the electrostatic ink composition, in some examples 70% to 90% by weight of the solids of the electrostatic ink composition. The remaining wt % of the solids in the ink composition may be a pigment and, in some examples, any other additives that may be present.

Charge Director

In some examples, the electrostatic ink composition includes a charge director. The charge director may be added to an electrostatic ink composition in order to impart and/or maintain sufficient electrostatic charge on the ink particles. In some examples, the charge director may be selected from ionic compounds, such as metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. In some examples, the charge director is selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of a sulfonic acid. The sulfonic acids may include, but are not limited to, alkyl sulfonic acids, aryl sulfonic acids, and sulfonic acids of alkyl succinates (e.g. see WO 2007/130069). In some examples, the charge director imparts a negative charge on the particles of the ink composition. In some examples, the charge director imparts a positive charge on the particles of the ink composition.

In some examples, the charge director includes a sulfosuccinate moiety of the general formula $[R_1\!-\!O\!-\!C(O)CH_2CH(SO_3^-)C(O)\!-\!O\!-\!R_2]$, where each of $R_1$ and $R_2$ is an alkyl group. In some examples, the charge director includes nanoparticles of a simple salt and a sulfosuccinate salt of the general formula MAn, wherein M is a metal, n is the valence of M, and A is an ion of the general formula $[R_{1'}\!-\!O\!-\!C(O)CH_2CH(SO_3^-)C(O)\!-\!O\!-\!R_{2'}]$, where each of $R_{1'}$ and $R_{2'}$ is an alkyl group, or other charge directors as found in WO2007130069, which is incorporation herein by reference in its entirety. As described in WO2007130069, the sulfosuccinate salt of the general formula MAn is an example of a micelle forming salt. The charge director may be substantially free or free of an acid of the general formula HA, where A is as described above.

The charge director may include micelles of said sulfosuccinate salt enclosing at least some of the nanoparticles. The charge director may include at least some nanoparticles having a size of 200 nm or less, and/or in some examples 2 nm or more. As described in WO2007130069, simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, NH4, tert-butyl ammonium, Li+, and Al+3, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), Cl-, $BF_4^-$, F–, $ClO_4$–, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)3$, $LiClO_4$ and $LiBF_4$, or any sub-group thereof. The charge director may further include basic barium petronate (BBP).

In the formula $[R_{1'}\!-\!O\!-\!C(O)CH_2CH(SO_3^-)C(O)\!-\!O\!-\!R_{2'}]$, in some examples each of $R_{1'}$ and $R_{2'}$ is an aliphatic alkyl group. In some examples, each of $R_{1'}$ and $R_{2'}$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R_{1'}$ and $R_{2'}$ are the same. In some examples, at least one of |$R_{1'}$ and $R_{2'}$ is C13H27. In some examples, M is Na, K, Cs, Ca, or Ba. The formula $[R_{1'}\!-\!O\!-\!C(O)CH_2CH(SO_3^-)C(O)\!-\!O\!-\!R_{2'}]$ and/or the formula MAn may be as defined in any part of WO2007130069.

The charge director may include one of, some of or all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20%, in some examples 0.01% to 20% by weight, in some examples 0.01 to 10% by weight, in some examples 0.01% to 1% by weight of the solids of an electrostatic ink composition. In some examples, the charge director constitutes about 0.001% to 0.15% by weight of the solids of the electrostatic ink composition, in some examples 0.001% to 0.15%, in some examples 0.001% to 0.02% by weight of the solids of an electrostatic ink composition, in some examples 0.1% to 2% by weight of the solids of the electrostatic ink composition, in some examples 0.2% to 1.5% by weight of the solids of the electrostatic ink composition in some examples 0.1% to 1% by weight of the solids of the electrostatic ink composition, in some examples 0.2% to 0.8% by weight of the solids of the electrostatic ink composition.

In some examples, the charge director is present in an amount of from 3 mg/g to 20 mg/g, in some examples from 3 mg/g to 15 mg/g, in some examples from 10 mg/g to 15 mg/g, in some examples from 5 mg/g to 10 mg/g (where mg/g indicates mg per gram of solids of the electrostatic ink composition).

Other Additives

The electrostatic ink composition may include another additive or a plurality of other additives. The other additive or plurality of other additives may be added at any stage of the method. The other additive or plurality of other additives may be selected from a charge adjuvant, a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

In some examples, the electrostatic ink composition includes a charge adjuvant. A charge adjuvant may promote charging of the particles when a charge director is present. The method as described here may involve adding a charge adjuvant at any stage. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. In some examples, the charge adjuvant is VCA (an aluminium tristearate and palmitate salt, available from Sigma Aldrich).

The charge adjuvant may be present in an amount of about 0.1 to 5% by weight, in some examples about 0.1 to 1% by weight, in some examples about 0.3 to 0.8% by weight of the solids of the electrostatic ink composition, in some examples about 1 wt % to 3 wt % of the solids of the electrostatic ink composition, in some examples about 1.5 wt % to 2.5 wt % of the solids of the electrostatic ink composition.

The charge adjuvant may be present in an amount of less than 5.0% by weight of total solids of the electrostatic ink composition, in some examples in an amount of less than 4.5% by weight, in some examples in an amount of less than 4.0% by weight, in some examples in an amount of less than 3.5% by weight, in some examples in an amount of less than 3.0% by weight, in some examples in an amount of less than 2.5% by weight, in some examples in an amount of less than 2.0% by weight of the solids of the electrostatic ink composition.

In some examples, the electrostatic ink composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a C8 to C28 fatty acid anion, in some examples a C14 to C22 fatty acid anion, in some examples a Cm to C20 fatty acid anion, in some examples a C17, C18 or C19 fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of a multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition, in some examples about 1 wt % to 3 wt % of the solids of the electrostatic ink composition, in some examples about 1.5 wt % to 2.5 wt % of the solids of the electrostatic ink composition.

In some examples, the electrostatic ink composition comprises substantially no charge adjuvant. In some examples, the electrostatic ink composition lacks a charge adjuvant.

In some examples, the electrostatic ink composition contains substantially none of the materials listed herein as charge adjuvants. In some examples, the electrostatic ink composition contains essentially none of the materials listed herein as charge adjuvants.

In some examples, the electrostatic ink composition contains substantially no, or lacks, a salt of a multivalent cation and a fatty acid anion, in some examples the multivalent cation and fatty acid anion being as described above. In some examples, the multivalent cation being selected from Group 2, transition metals and Group 3 and Group 4 in the Periodic Table, for example Ca, Sc, Ti, V, Cr, Mn, Fe, Co, Ni, Cu, Zn, Al and Pb. In some examples, the fatty acid anion being selected from a C8 to C28 fatty acid anion, in some examples a C14 to C22 fatty acid anion, in some examples a Cm to C20 fatty acid anion, in some examples a C17, C18 or C19 fatty acid anion. In some examples, the fatty acid anion being selected from a caprylic acid anion, capric acid anion, lauric acid anion, myristic acid anion, palmitic acid anion, stearic acid anion, arachidic acid anion, behenic acid anion and cerotic acid anion.

In some examples, the electrostatic ink composition contains substantially no, or lacks, aluminum di- or tristearate including VCA.

In some examples, the electrostatic ink composition contains substantially no, or lacks; barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate.

In some examples, "substantially no" is used to mean that the particular component, e.g. a charge adjuvant, constitutes less than 0.1 wt. % of the solids of the electrostatic ink composition, in some examples less than 0.05 wt. % of the solids of the electrostatic ink composition, in some examples less than 0.01 wt. % of the solids of the electrostatic ink composition, in some examples less than 0.005 wt. % of the solids of the electrostatic ink composition, in some examples less than 0.001 wt. % of the solids of the electrostatic ink composition, in some examples less than 0.0005 wt. % of the solids of the electrostatic ink composition, in some examples less than 0.0001 wt. % of the solids of the electrostatic ink composition.

Tackifier

In some examples, the electrostatic ink composition includes a tackifier which is dissolved in the carrier liquid.

A tackifer is soluble in a hydrocarbon carrier liquid. In some examples, the tackifier is capable of forming a film when an electrostatic ink composition comprising a tackier is printed on a print substrate.

In some examples, the tackifier is selected from rosin resins, hydrocarbon resins, terpene resins, copolymers of vinyl acrylate and combinations thereof.

In some examples, rosin resins include any of wood rosin, gum rosin, or by-products of the paper making process (tall oil rosin). In some examples, the utility of rosin resins may be improved via several chemical modifications. These modifications may include esterification, hydrogenation, dimerization, functionalization, or any combination of these. Rosin resins, unlike hydrocarbon resins, are not considered to be polymers. Rosin resins may be a blend of distinct molecules.

Rosin resins may be a mixture of eight closely related rosin acids characterized by three fused six-carbon rings, double bonds that vary in number and location, and a single carboxylic acid group. An example of this family is a dimerized rosic acid with an acid number of 145 and softening point of 144° C.

Hydrocarbon resins include petroleum based aliphatic (C5), aromatic (C9), DCPD (dicyclopentadiene), or mixtures of these. An example is the Regalite™ hydrogenated hydrocarbon resins by Eastman.

Terpene Resins, which may also be referred to as "universal tackifiers", may be derived from terpene feedstocks either from wood sources or citrus fruit.

Examples of copolymers of vinyl acrylate include Plioway Ultra 200 by Eliokem (Omnova) or derivatives of.

In some examples, the electrostatic ink composition comprises about 5 wt. % or less of tackifier by total weight of the composition. In some examples, the electrostatic ink composition comprises about 3 wt. % or less of tackifier by total weight of the composition. In some examples, the electrostatic ink composition comprises about 2 wt. % or less of tackifier by total weight of the composition. In some examples, the electrostatic ink composition comprises about 1 wt. % or less of tackifier by total weight of the composition.

In some examples, the electrostatic ink composition comprises at least about 0.01 wt. % of tackifier by total weight of the composition. In some examples, the electrostatic ink composition comprises at least about 0.1 wt. % of tackifier by total weight of the composition. In some examples, the electrostatic ink composition comprises at least about 0.3 wt. % of tackifier by total weight of the composition.

A tackifer may be added to the electrostatic ink composition in order to improve transfer of the electrostatic ink composition from an intermediate transfer member (ITM) to a print substrate in a Liquid Electrophotographic printing process.

Method of Producing an Electrostatic Ink Composition

Also provided is a method of producing an electrostatic ink composition. The method comprises, in some examples, combining a resin, a phosphorescent pigment and a carrier liquid.

In some examples, the method comprises first combining a resin and a carrier liquid and subsequently adding the phosphorescent pigment.

In some examples, the method comprises combining a resin and carrier liquid to form a paste and subsequently adding the phosphorescent pigment.

In some examples, the resin and carrier liquid are combined and heated to a temperature in the range of 100° C. to 200° C., in some examples 120° C. to 150° C., for example to melt the resin. In some examples the resin and carrier liquid are combined and heated to a temperature above the melting point of the resin. In some examples, the resin and carrier liquid are combined and mixed at a temperature in the range of 100° C. to 200° C., in some examples 120° C. to 150° C., for example to melt the resin. In some examples, the resin and carrier liquid are heated to a temperature above the melting point of the resin before, during or after mixing. In some examples, after combining the resin and the carrier liquid, the resulting mixture is cooled to have a temperature of lower than 100° C. before the phosphorescent pigment is added to the resin and carrier liquid mixture. In some examples, the resulting mixture is cooled to have a temperature of 90° C. or lower, in some examples 80° C. or lower, in some examples 60° C. or lower, in some examples 50° C. or lower, before the phosphorescent pigment is added to the resin and carrier liquid mixture.

In some examples, after combining the resin and the carrier liquid, the resulting mixture is cooled to have a temperature of lower than the melting point of the resin before the phosphorescent pigment is added to the resin and carrier liquid mixture.

In some examples, the method comprises adding the phosphorescent pigment to the resin and carrier liquid mixture to form pigment particles comprising the phosphorescent pigment and the resin.

In some examples the method comprises grinding the resin in the presence of the carrier liquid to form a paste.

In some examples, the method comprises heating and mixing the resin in the presence of a carrier liquid to form a paste.

In some examples, the method comprises adding a phosphorescent pigment to a paste comprising the resin and carrier liquid to form pigment particles comprising the phosphorescent pigment and the resin. In some examples, the method comprises adding a phosphorescent pigment to the paste and grinding the phosphorescent pigment and the paste to form pigment particles comprising the phosphorescent pigment and the resin. In some examples, the method comprises grinding the phosphorescent pigment and the paste with a charge adjuvant. In some examples, the method comprises grinding the phosphorescent pigment and paste with substantially no charge adjuvant.

In some examples, the method comprises grinding the phosphorescent pigment and a paste comprising the resin and carrier liquid at a grinding speed of at least 50 rpm. In some examples, the method comprises grinding the phosphorescent pigment and a paste comprising the resin and carrier liquid at a grinding speed of up to about 600 rpm. In some examples, the method comprises grinding the phosphorescent pigment and a paste comprising the resin and carrier liquid for at least 1 hour, in some examples for at least 2 hours. In some examples, the method comprises grinding the phosphorescent pigment and a paste comprising the resin and carrier liquid for up to about 12 hours. In some examples, the method comprises grinding the phosphorescent pigment and a paste comprising the resin and carrier liquid at a temperatures of about 40° C.

Printing Process and Print Substrate

Also provided is a method of electrostatic printing, the method including:
- producing or providing an electrostatic ink composition as described herein,
- contacting the electrostatic ink composition with a latent electrostatic image on a surface to create a developed image,
- transferring the developed image to a print substrate, in some examples via an intermediate transfer member.

In some examples, the surface on which the (latent) electrostatic image is formed or developed may be on a rotating member, e.g. in the form of a cylinder. The surface on which the (latent) electrostatic image is formed or developed may form part of a photo imaging plate (PIP). The method may involve passing the electrostatic ink composition between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated, e.g. to a temperature of from 80 to 160° C.

The present disclosure also provides an electrostatic ink composition producible according to the method described herein. There may also be provided a print substrate having printed thereon an electrostatic ink composition as described herein and/or producible according to the method described herein.

The print substrate may be any suitable substrate. The substrate may be any suitable substrate capable of having an image printed thereon. The substrate may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print. In some examples, a primer may be coated onto the print substrate, before the electrostatic ink composition is printed onto the print substrate.

FIG. 1 shows a schematic illustration of a Liquid Electro Photographic (LEP) printing apparatus which may be used to print an electrostatic ink composition as described herein. An image, including any combination of graphics, text and images, may be communicated to the LEP printing apparatus 1. According to an illustrative example, in order to print the electrostatic ink composition, firstly, the photo charging unit 2 deposits a uniform static charge on the photo-imaging cylinder 4 and then a laser imaging portion 3 of the photo charging unit 2 dissipates the static charges in selected portions of the image area on the photo-imaging cylinder 4 to leave a latent electrostatic image. The latent electrostatic image is an electrostatic charge pattern representing the image to be printed. The electrostatic ink composition is then transferred to the photo-imaging cylinder 4 by Binary Ink Developer (BID) unit 6. The BID unit 6 present a uniform film of the electrostatic ink composition to the photo-imaging cylinder 4. A resin component of the electrostatic ink composition may be electrically charged by virtue of an appropriate potential applied to the electrostatic ink composition in the BID unit. The charged resin component which, by virtue of an appropriate potential on the electrostatic image areas, is attracted to the latent electrostatic image on the photo-imaging cylinder 4 (first transfer). The electrostatic ink composition does not adhere to the uncharged, non-image areas and forms an image on the surface of the latent electrostatic image. The photo-imaging cylinder 4 then has a developed electrostatic ink composition image on its surface.

The image is then transferred from the photo-imaging cylinder 4 to the intermediate transfer member (ITM) 8 by virtue of an appropriate potential applied between the photo-imaging cylinder ∝and the ITM 8, such that the charged electrostatic ink composition is attracted to the ITM 8 (second transfer). The image is then dried and fused on the ITM 8 before being transferred to a print substrate 10.

Between the first and second transfers the solid content of the electrostatic ink composition image is increased and the electrostatic ink composition is fused on to the ITM 8. For example, the solid content of the electrostatic ink composition image deposited on the ITM 8 after the first transfer is typically around 20%, by the second transfer the solid content of the image is typically around 80-90%. This drying and fusing is typically achieved by using elevated temperatures and air flow assisted drying. In some examples, the ITM 8 is heatable.

EXAMPLES

The following illustrate examples of the compositions, methods and other aspects described herein. Thus, these Examples should not be considered as limitations of the present disclosure, but are merely in place to teach how to make examples of the present disclosure.

Example 1

Materials:
Resin: Nucrel®699 from Dupont and AC-5120 (from Honeywell)
Phosphorescent pigment: Ultra green v10 (PDPG) from Glow Inc.
Carrier liquid: Isopar L, an iso-parafinic oil manufactured by EXXON.
Charge adjuvant: VCA
Charge director: NCD—a natural charge director having the components (i) natural soya lecithin, (ii) basic barium petronate, and (iii) dodecyl benzene sulphonic acid, amine salt, with the components (i), (ii) and (iii) being present in the weight ratios of 6.6%:9.8:3.6%.

Preparation of Electrostatic Ink Composition:

The resins Nucrel®699 and AC-5120 where inserted at 40% NVS in the presence of Isopar-L into a Ross mixer (Model DPM-2, obtained from Charles Ross & Son Company—Hauppauge, N.Y.) at 120-150° C. and 50 rpm for 90 min, and Then the RPM raised to 70 rpm for 120 min. Then the temperature was lowered to room temperature and the speed of the Ross mixer lowered to 50 rpm after 30 min. A paste was obtained.

The phosphorescent pigment was ground with the paste at a ratio of 1:1 (pigment:paste) by weight for 2 h (in the presence of 2% VCA) in a ceramic attritor (Union Process Attritor system—a batch type Szegvari attritor system with a mill size of 1 gallon), without any prior treatment. The grinding conditions were: 40° C., 250 rpm and the overall material in the attritor was 1000 g.

From the ground material a 4.5% NVS WD (working dispersion) was produced by adding 2623 g Isopar L to 878 g of the ground material. The charge director was then added (6 mg/1 g Isopar-L) to the working dispersion to provide a green phosphorescent electrostatic ink to be used in a LEP apparatus.

Example 2

Materials:

Resin: Nucrel®599 from Dupont—copolymer of ethylene and methacrylic acid, made with nominally 10 wt % methacrylic acid. Resin was used as received.

Phosphorescent pigment: Green LumiNova GLL-300FF (from UMC).

Carrier liquid: Isopar L, an iso-parafinic oil manufactured by EXXON.

Charge director: NCD, a natural charge director having the components (i) natural soya lecithin, (ii) basic barium petronate, and (iii) dodecyl benzene sulphonic acid, amine salt, with the components (i), (ii) and (iii) being present in the weight ratios of 6.6%:9.8:3.6%.

Charge adjuvant: VCA

Preparation of Electrostatic Ink Composition:

A paste of molten resin (Nucrel®599) in Isopar-L at 31% NVS was prepared in a double-planetary mixer device, in which the ingredients (Nucrel®599 and Isopar-L) were placed and heated to a temperature of 120° C. to 160° C. and mixed for about 3 hours. After that time, the heating was stopped and mixing continued until the ingredients reached room temperature.

The paste was then added to a 1 litre ceramic-lined tank of 0-S Attritor batch grinding mill (available from Union Process Co., Akron, Ohio) with a phosphorescent pigment and a charge adjuvant, Isopar-L was added to give 18 wt % NVS in the mill, the formulation of the composition in the attritor is set out in Table 1 below. The grinding conditions were: 40° C., 250 rpm and the overall material in the attritor was 230 g.

TABLE 1

|  | % (by total solids) in formulation | Mass (g) | % NVS |
|---|---|---|---|
| Paste molten resin Nurcel 599, 25% NVS | 58 | 96.05 | 25 |
| Phosphorescent pigment BGL 300FF | 40 | 16.56 | 100 |
| VGA | 2 | 0.83 | 100 |
| Isopar L |  | 116.6 |  |
| Ink NVS attritor |  |  | 18 |

Isopar-L was then added to the ground material to produce a working dispersion having 4.5% NVS. The charge director was then added (6 mg/1 g Isopar-L) to the working dispersion to provide a blue-green phosphorescent electrostatic ink to be used in a LEP apparatus.

Example 3

An electrostatic ink composition was produced according to Example 2, except that no charge adjuvant was added.

Example 4

An electrostatic ink composition was produced according to Example 2, except that the phosphorescent pigment used was LumiNova GLL-300FF (from UMC) to produce a green electrostatic ink composition.

Example 5

An electrostatic ink composition was produced according to Example 4, except that no charge adjuvant was added.

Example 6

An electrostatic ink composition was produced according to Example 2, except that the phosphorescent pigment used was LumiNova V-300M (from UMC) to produce a violet electrostatic ink composition.

Example 7

An electrostatic ink composition was produced according to Example 6 except that no charge adjuvant was added.

Example 8

An electrostatic ink composition was produced according to Example 2, except that the phosphorescent pigment used was Ultra green v10 (PDPG) from Glow Inc to produce a green electrostatic ink composition.

Example 9

An electrostatic ink composition was produced according to Example 8 except that no charge adjuvant was added.

Each of the electrostatic ink compositions produced in Examples 1-9 were printed on to paper print substrates using a HP Indigo 7XXX series printing press. For each electrostatic ink composition an image was produced comprising 1, 2 or 4 layers of the electrostatic ink composition.

It was found that electrostatic ink compositions comprising Nucrel® 599 as the resin (i.e. a polymer having acid side groups and a melt flow rate greater than about 200 g/10 minutes) showed improved transfer from the ITM to the print substrate on LEP printing of the electrostatic ink composition.

While the method, the electrostatic ink composition and related aspects have been described with reference to certain examples, those skilled in the art will appreciate that various modifications, changes, omissions, and substitutions can be made without departing from the spirit of the disclosure. It is intended, therefore, that the method, compositions and related aspects be limited by the scope of the following claims. The features of any dependent claim can be combined with the features of any of the other dependent claims, and any independent claim.

The invention claimed is:

1. An electrostatic ink composition comprising:
   a carrier liquid;
   a charge director;
   substantially no charge adjuvant;
   a resin;
   a phosphorescent pigment selected from the group consisting of an alkaline earth metal aluminate with titanium, a silicate aluminate, and a silicate; and
   a tackifier selected from the group consisting of a rosin resin, a terpene resin, and a copolymer of vinyl acrylate, wherein between at least about 0.1 wt% and about 5 wt% of the tackifier is dissolved in the carrier liquid based on a total weight of the electrostatic ink composition.

2. An electrostatic ink composition according to claim 1, wherein the phosphorescent pigment constitutes from about 10 wt. % to about 50 wt. % of the total solids of the electrostatic ink composition.

3. The electrostatic ink composition according to claim 1, wherein the phosphorescent pigment is the alkaline earth metal aluminate with titanium.

4. The electrostatic ink composition according to claim 1, wherein the phosphorescent pigment is the silicate aluminate.

5. The electrostatic ink composition according to claim 1, wherein the resin comprises a polymer having acid side groups.

6. An electrostatic ink composition according to claim 5, wherein the resin comprises a copolymer of an alkylene monomer and a monomer having an acid side group.

7. An electrostatic ink composition according to claim 6, wherein the alkylene monomer is an ethylene or a propylene monomer and the monomer having an acid side group is an acrylic acid monomer or a methacrylic acid monomer.

8. An electrostatic ink composition according to claim 5, wherein the polymer having acid side groups has a melt flow rate of greater than about 200 g/10 minutes.

9. An electrostatic ink composition according to claim 8, wherein the polymer having acid side groups having a melt flow rate of greater than about 200 g/10 minutes constitutes at least 50 wt. % of the resin.

10. A method for producing the electrostatic ink composition according to claim 1, the method comprising combining the resin, the phosphorescent pigment, the charge director, the substantially no charge adjuvant, the tackifier, and the carrier liquid.

11. The method according to claim 10 comprising first combining the resin and the carrier liquid to form a resin and carrier liquid mixture, and subsequently combining the phosphorescent pigment with the resin and carrier liquid mixture to form the electrostatic ink composition, and then adding the tackifier to the electrostatic ink composition.

12. The method according to claim 11, wherein the resin and the carrier liquid are combined and mixed at a temperature in the range of 100 ° C. to 200 ° C., and the resulting mixture is cooled to have a temperature of lower than 100 ° C. before the phosphorescent pigment is added to the resin and carrier liquid mixture.

13. The method according to claim 11, further comprising grinding a combination of the resin, the phosphorescent pigment, and the carrier liquid for about 2 hours at a grinding speed of about 250 rpm and a temperature of about 40 ° C.

14. The method according to claim 11, further comprising grinding a combination of the resin, the phosphorescent pigment, and the carrier liquid in an attritor, wherein the overall material in the attritor is in the range of about 230g to about 1000g.

15. An electrostatic ink composition comprising:
   a carrier liquid;
   a charge director;
   substantially no charge adjuvant;
   a resin;
   a phosphorescent pigment selected from the group consisting of an alkaline earth metal aluminate with titanium, a silicate alum inate, a zinc sulfide, and a silicate; and
   a tackifier dissolved in the carrier liquid, the tackifier being a rosin resin.

16. The electrostatic ink composition according to claim 1, wherein the charge director is selected from the group consisting of metal salts of sulfo-succinates, metal salts of oxyphosphates, metal salts of alkyl-benzenesulfonic acid, polyoxyethylated alkylamines, lecithin, polyvinylpyrrolidone, organic acid esters of polyvalent alcohols, polybutylene succinim ides, glyceride salts, and combinations thereof.

17. The electrostatic ink composition according to claim 1, wherein the charge director is selected from the group consisting of metal salts of oxyphosphates, metal salts of alkyl-benzenesulfonic acid, polyoxyethylated alkylamines, polyvinylpyrrolidone, organic acid esters of polyvalent alcohols, polybutylene succinim ides, glyceride salts, and combinations thereof.

18. The electrostatic ink composition according to claim 15, wherein the rosin resin is a dimerized rosin acid with an acid number of 145 and softening point of 144 ° C.

* * * * *